United States Patent

Norris

[15] 3,658,672

[45] Apr. 25, 1972

[54] METHOD OF DETECTING THE COMPLETION OF PLASMA ANODIZATION OF A METAL ON A SEMICONDUCTOR BODY

[72] Inventor: Peter Edward Norris, Princeton, N.J.

[73] Assignee: RCA Corporation

[22] Filed: Dec. 1, 1970

[21] Appl. No.: 94,021

[52] U.S. Cl. ....................204/164, 204/323

[51] Int. Cl. ....................C23b 11/02, B01k 1/00

[58] Field of Search ....................204/164

[56] References Cited

UNITED STATES PATENTS

| | | | |
|---|---|---|---|
| 3,345,274 | 10/1967 | Schmidt | 204/15 |
| 3,365,379 | 1/1968 | Kaiser | 204/56 R |
| 3,394,066 | 7/1968 | Miles | 204/164 |
| 3,414,490 | 12/1968 | Thornton | 204/58 X |
| 3,556,966 | 1/1971 | Waxman et al. | 204/164 |

*Primary Examiner*—F. C. Edmundson
*Attorney*—Glenn H. Bruestle

[57] ABSTRACT

The method comprises (a) connecting a source of constant current in a series circuit with the plasma and the semiconductor body, (b) periodically illuminating the metal being anodized with light to produce photocurrents when the metal approaches the completion of anodization, (c) monitoring the voltage across the source of constant current, and (d) terminating the plasma anodization when the monitored voltage ceases to fluctuate as a result of the aforementioned periodic illumination.

10 Claims, 5 Drawing Figures

Inventor:
PETER E. NORRIS
By Arthur I. Spechler
Attorney

Patented April 25, 1972 3,658,672

2 Sheets-Sheet 2

Inventor:
PETER E. NORRIS

By Arthur J. Spechler
Attorney

METHOD OF DETECTING THE COMPLETION OF PLASMA ANODIZATION OF A METAL ON A SEMICONDUCTOR BODY

BACKGROUND OF THE INVENTION

This invention relates generally to the plasma anodization of metals, and more particularly, to a method of detecting the completion of the plasma anodization of a metal on a semiconductor body. The novel method is particularly useful in the manufacture of MIS (metal-insulator-semiconductor) transistors, as where a layer of an aluminum oxide produced by plasma anodization is used as a gate insulator. Such manufacture is described, for example, in the U.S. patent application, Ser. No. 699,211, filed on Jan. 19, 1968, for "Semiconductor Devices Including Plasma Anodized Aluminum Coatings," and is included herein by reference.

In the manufacture of MIS semiconductor devices and semiconductor integrated circuits, for example, a layer of aluminum oxide, $Al_2O_3$, as a gate insulator has been shown to have certain advantages over conventional prior-art gate insulators. For example, the radiation behavior of an aluminum oxide gate is better, and the breakdown strength is higher, than that observed for silicon dioxide coatings. These characteristics are especially important in semiconductor devices intended for use in outer space. In converting an aluminum layer into aluminum oxide by the plasma anodization process, a preferred process, the conversion is accomplished in an oxygen plasma. In order for a semiconductor device using an aluminum oxide gate to operate properly, the entire metal layer should be converted to the metal oxide. Even an extremely thin metallic film remnant at the metal-semiconductor interface prevents effective control of the semiconductor; that is, MIS operation. On the other hand, if the anodization is allowed to continue beyond the point where the entire metal layer is converted to the metal oxide, the surface of the underlying semiconductor substrate beings to oxidize, and this condition also degrades the performance of the semiconductor device.

A few methods of detecting the completion of the plasma anodization have been proposed, but some of these prior-art methods necessitate the removal of the semiconductor device from the plasma source. In one prior-art method, it has been proposed to measure the thickness of the metal film before plasma anodization and to anodize for a period of time on the basis of a known rate of anodization. Other prior-art methods of determining the completion of anodization employ very accurately aligned polarized light or infrared light, but all of these methods are time consuming, and are subject to error in the range of metal thicknesses less than 20 A. Also, while some prior-art methods are suitable for uniform metal layers, these methods are not applicable to situations in which materials other than the metal layer is present, as in the case of MIS transistor fabrication.

SUMMARY OF THE INVENTION

The completion of the plasma anodization of a metal layer on a semiconductor body is determined by providing a constant current in a series circuit including the plasma, the semiconductor body, and the metal layer with the current flowing in a (conventional) direction from the semiconductor body to the metal layer. The body and metal layer are illuminated periodically with light so as to cause a photocurrent to flow in the series circuit when the metal layer is illuminated as it approaches the completion of anodization. When the photocurrent ceases, the plasma anodization is completed.

In a preferred embodiment of the novel method, the photocurrent, that is, the photoeffect, is detected by monitoring the voltage across the constant-current source.

The novel method of detecting the completion of plasma anodization has advantages over the prior-art methods in that it is relatively inexpensive and convenient to carry out, is extremely sensitive to thin metal layers, does not use apparatus that requires critical alignment, and is employed in situ without having to interrupt the plasma anodization until completed.

DESCRIPTION OF THE PREFERRED EMBODIMENTS

Figures 1, 3:
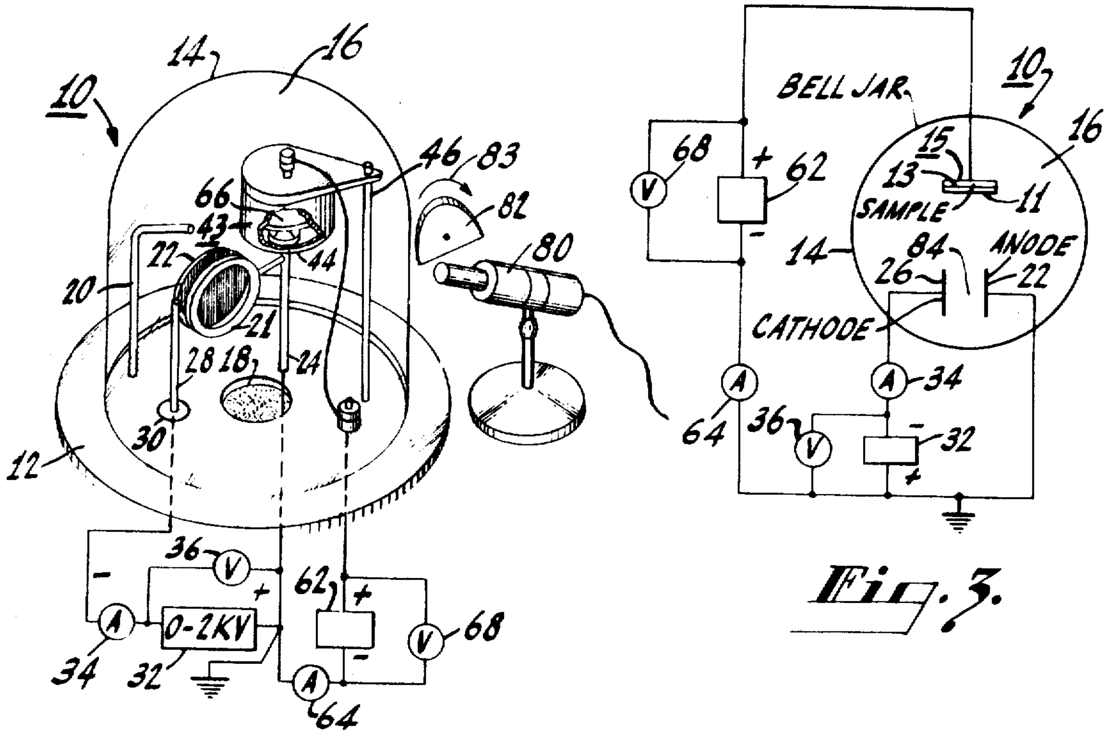
FIG. 1 is a perspective view, partly schematic, of apparatus for carrying out the novel method.
FIG. 3 is a schematic drawing of the circuitry employed for carrying out the novel method.
Figure 2:
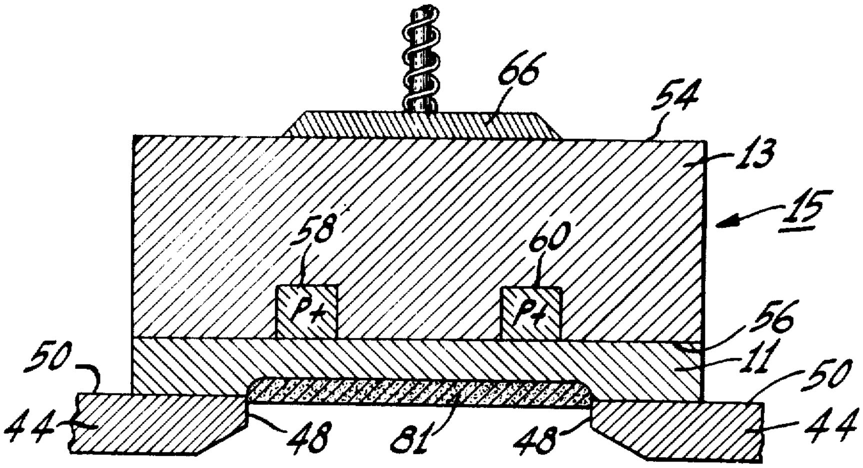
FIG. 2 is an enlarged, fragmentary, cross-sectional view of a semiconductor device disposed in the apparatus illustrated in FIG. 1 while undergoing the process of plasma anodization in accordance with the novel method.

Referring now to FIGS. 1, 2, and 3, there is shown apparatus 10 for carrying out the plasma anodization of a metal layer 11 (FIG. 2) on a semiconductor body 13 of a semiconductor device 15 and for detecting when the metal layer 11 is completely anodized so that the anodization process may be terminated. The apparatus 10 comprises a base plate 12 and a bell jar 14 sealed to the base plate 12 with an air-tight seal to provide a chamber 16 within the bell jar 14 that can be evacuated.

An opening 18 in the base plate 12 communicates with a vacuum pump system (not shown) for evacuating gases within the chamber 16. A pipe 20 within the chamber 16 extends through the base plate 12 and communicates with a source of oxygen and means for controlling it (not shown) so that the chamber 16 can be filled with oxygen, in a manner known in the art and for the purpose hereinafter appearing.

Means are provided to ignite an oxygen plasma within the chamber 16. To this end, there is provided an anode 22 that comprises a circular disk of a metal, such as platinum. The anode 22 is supported by a metal rod 24 that extends upwardly from the base plate 12. A cathode 26 comprises a ring of metal, such as aluminum, that is supported by a metal rod 28 that extends through the base plate 12 and is insulated therefrom by an insulator 30. A voltage source 32 of unidirectional voltage, capable of providing 0 to 2 kv., is used to create an oxygen plasma by providing a strong electric field between the anode 22 and the cathode 26. The positive terminal of the voltage source 32 is connected to the anode 22 and grounded. The negative terminal of the voltage source 32 is connected to the cathode 26 through an ammeter 34. A voltmeter 36 is connected across the voltage source 22 to indicate its output voltage.

Means are provided to support the semiconductor device 15 within the chamber 16 so that the metal film 11 thereon can be anodized. To this end, a sample holder 43, comprising a support plate 44 (FIG. 2) of an insulating material, such as anodized aluminum, is supported within the chamber 16 by, and electrically insulated from, a rod 46 that extends from the base plate 12. The support plate 44 is formed with an opening 48 therein, and the semiconductor device 15 is placed on the upper surface 50 of the support plate 44 so that the portion of the metal layer 11 that is to be anodized is exposed by the opening 48, as shown in FIG. 2.

The semiconductor device 15 is an MIS transistor in the process of its manufacture, as described in the aforementioned patent application. The semiconductor body 13 has an upper surface 54 and a lower surface 56. Two spaced-apart P+ regions, constituting source and drain regions 58 and 60, respectively, have been diffused previously through the lower surface 56 into the semiconductor body 13. The metal layer 11 has also been evaporated previously onto the lower 56 and over the source 58 and drain 60. In a typical MIS transistor, the thickness of the semiconductor body 13 may be in the neighborhood of about 15 mils and the thickness of the metal layer 11 may be in the neighborhood of about 400 A. Before being placed in the apparatus 10, the semiconductor device is "baked-out," that is, heated in a vacuum of about $10^{-6}$ Torr for about 1 hour to expel water vapor and adsorbed gases.

Means are provided to send a constant current through the semiconductor device 15 in a direction so that conventional current flows from the semiconductor body 13 to the metal layer 11. To this end, a constant-current source 62, capable of delivering 0 to 100 mA at 0–100 v., is connected between the grounded positive terminal of the voltage source 32 and the upper surface 54 of the semiconductor body 13. The negative terminal of the constant-current source 62 is connected to the positive terminal of the voltage source 32 through an ammeter 64, and the positive terminal of the constant-current source 62 is connected to the upper surface 54 of the semiconductor body 13 through a pressure contact 66 within the sample holder 43, by any suitable means known in the art. Voltage recording means 68, such as a voltmeter or a graph-recording voltage indicator, is connected across the constant-current source 62 for the purpose hereinafter appearing.

Means are provided to illuminate periodically the metal layer 11 of the semiconductor body 15 during the process of anodization. To this end, a light source 80, such as a 50 watt microscope lamp, for example, is positioned to direct a beam of light through the bell jar 14 and onto the metal layer 11. The light source 80 should be a distance of about 12 inches from the semiconductor device 15 and positioned so as to direct its beam through the opening 48 in the support plate 44. A chopper wheel 82, rotated by a motor (not shown), in the beam of the light source 80, is provided to turn the light beam on and off, that is, to interrupt the light beam periodically, for the purpose hereinafter appearing. The chopper wheel 82 rotated in the direction of the arrow 83 at a speed to interrupt the light beam at a frequency of about 20 cycles per second or A frequency range of between about 20 cycles per second and about 10 cycles per hour may be used, depending upon the conditions of the anodization process and materials utilized in the process.

The process of plasma anodization of the metal layer 11 by means of the apparatus 10 will now be explained. The chamber 16 is evacuated to $1 \times 10^{-6}$ Torr, and then backfilled with dry oxygen through the pipe 20. The oxygen pressure is set at 0.3 Torr and a glow discharge is ignited between the anode 22 and the cathode 26 by a voltage of about 1 kv. from the voltage source 32. The metal layer 11 of aluminum should be completely anodized for MIS applications. Hence, a voltage (varying with the time of anodization) at a current sufficient to anodize all of the metal layer 11 is applied. This voltage, however, must not be too high or an unwanted, troublesome thin film of silicon dioxide can be formed on the lower surface 56 of the semiconductor body 13. The silicon dioxide so formed in an MIS transistor can cause deterioration in its resistance to ionizing radiation in space.

In accordance with the novel method of detecting when the portion of the metal layer 11 exposed by the opening 48 in the support plate 44 is completely anodized, a constant current is provided by the constant-current source 62 to the series circuit comprising the semiconductor body 15, the oxygen plasma 84 between the anode 22 and the cathode 26, and the ammeter 64. For the aforementioned dimensions of the semiconductor device 15, a constant current of about 1 $mA/cm^2$ is suitable. As the metal layer 11 undergoes anodization, the electrical resistance of the anodized portion 81 (FIG. 2), that is, the metal oxide of the metal layer 11, increases. Since the current (I) through the semiconductor device 15, however, is maintained constant by the constant source 62, the voltage drop (V) across the increased resistance (R) of the anodized metal layer 11 increases (due to the increase in IR). Hence, any change in resistance in the aforementioned series circuit is due substantially to the anodization of the metal layer 11, and this change in voltage, referred to hereinafter as a sample voltage, can be measured by the voltage recording means 68.

Figure 4:
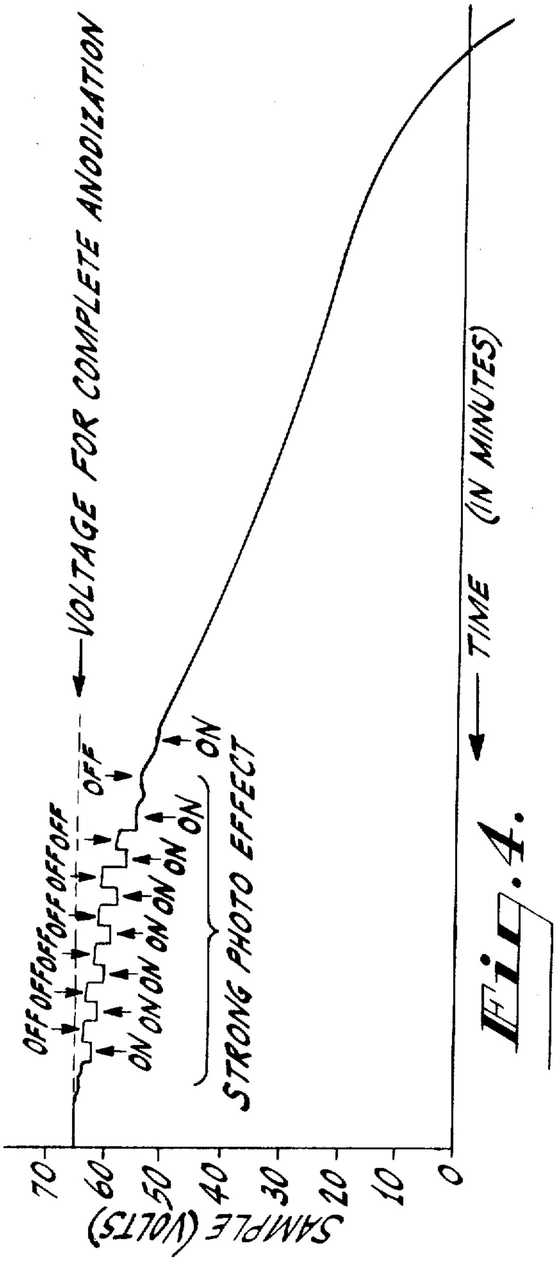
FIG. 4 is a graph of sample voltage versus time used to explain the operation of the novel method.

During the anodization process, the light source 80 is interrupted periodically, say every minute, for example, by the chopper 82. The "on" time may equal the "off" time and may last about 1 minute each. The "on" and "off" time would depend upon the sensitivity of the sample voltage recording system employed. The observed effect of illuminating the semiconductor device 15 periodically is to cause a decrease in the sample voltage reading periodically as indicated by the voltage recording means 68. If the voltage recording means 68 is a graph-recording voltage indicator, a sample voltage versus time graph of the type shown in FIG. 4 can be recorded. The photo-induced changes (changes in the sample voltage) in the semiconductor device 15 are observed first to grow in magnitude, as shown by the dips in the graph, until a maximum is reached and then to decrease to zero. The sample voltage for which the photo effect is no longer noticed is precisely the potential (sample voltage) which indicates complete anodization. Thus, as shown in FIG. 4, the anodization process is completed at the time when the sample voltage reaches 65 volts because fluctuations in the light directed upon the sample (semiconductor device 15) no longer cause fluctuations in the sample voltage.

In the above example, the time for complete anodization is 120 minutes. The time for complete anodization, however, will vary with the current values and with the geometry of the anodization system. The desired frequency of illuminating of the sample can be determined easily by observation if a recording voltmeter is used. The periodic illumination is necessary only as the metal layer approaches completion of the anodization process, as demonstrated by the graph of FIG. 4.

An explanation of the theory of the novel method is as follows. The decrease in sample voltage is due to the photocurrent contribution to the total constant current supplied by the constant-current source 62. Photocurrent, in effect, lowers the impedance provided by the semiconductor device 15 (sample) and thereby less applied voltage (sample voltage) to achieve a given value of constant current is necessary.

Figure 5:
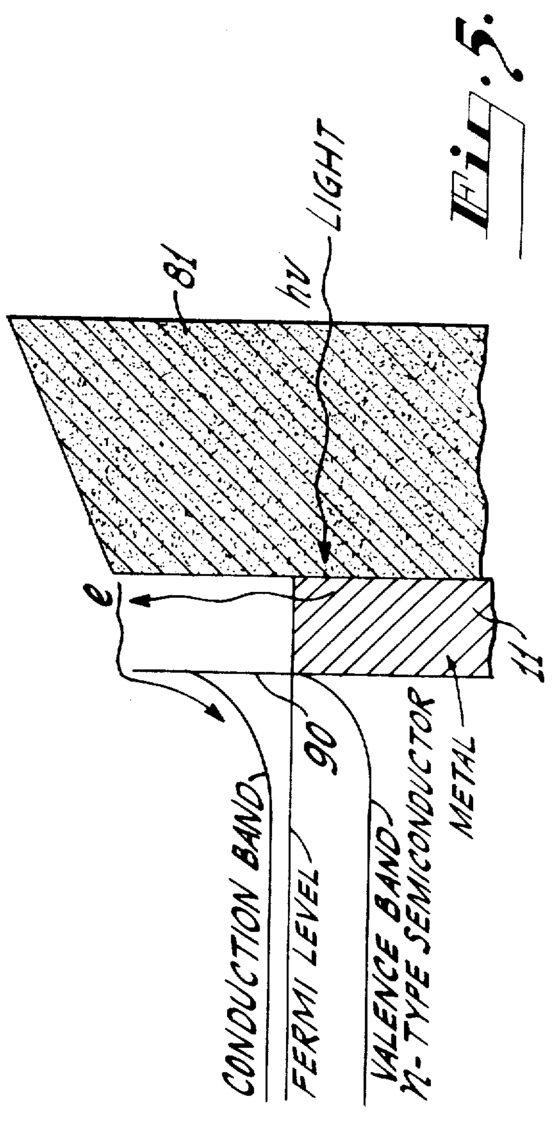
FIG. 5 is an energy diagram of a metal layer on an N-type semiconductor body during the plasma anodization of the metal layer in accordance with the novel method.

The photocurrent produced in the semiconductor device 15 during its illumination is due to electron injection over the metal-silicon barrier 90 (Schottky barrier), as illustrated in the energy diagram FIG. 5. Electrons in the metal layer 11 absorb incident photons ($h\nu$) producing so called "hot" or energetic electrons $e$. These electrons $e$ move toward the barrier 90 while losing energy through collisions. If the metal layer 11 is thin enough, as when a good portion of it has already been anodized, an appreciable fraction of the "hot" electrons $e$ reach the barrier 90 with enough energy to surmount it and to contribute to the photocurrent. This explains why the photo effect (photocurrent) is negligible for thick metal layers where the mean free path of the "hot" electrons $e$ is only a fraction of thickness of the metal layer 11. For metal layers on the order of one mean free path in thickness the photo effect is a maximum. The photo effect for extremely thin metal layers decreases due to a decrease in the photon absorption. This effect is seen only when the semiconductor body 13 is N-type. The photo effect is not observed when the semiconductor material is P-type because no Schottky barrier exists under anodization conditions.

The recorded negative voltage at the beginning of the anodization process, as shown in FIG. 4, is due to the plasma potential (wall potential) caused by a difference in the mobilities between the positive and negative ions in the plasma.

Thus, there has been provided a method of detecting the completion of plasma anodization of a metal on an N-type semiconductor body during the process of anodization and without the necessity of removing the anodized material from the plasma. While the novel method has been described in connection with a metal layer of aluminum, the novel method may also be used to determine the completion of anodization of any metal film that forms an oxide, such as thin films of barium, bismuth, calcium, cadmium, cobalt, chromium, copper, iron, hafnium, molybdenum, nickel, lead, tin, tantalum, vanadium, tungsten, zinc, and zirconium.

The dimensions of the semiconductor body and operating conditions for carrying out the novel method described herein are not critical and are given merely for illustrative purposes.

I claim:

1. In a method wherein a metal layer of a device, comprising said metal layer on an N-type semiconductor body, is anodized with ions from a plasma, the improvement of detecting the completion of anodization of said metal layer comprising providing a series circuit of said device and said plasma with a constant current from a constant-current source so that said constant current flows in a conventional direction from said semiconductor body to said metal layer, illuminating said device periodically with light, whereby to cause a photocurrent to flow in said circuit when the metal of said metal layer approaches complete anodization, and interrupting the anodization of said metal layer when said photocurrent ceases.

2. In a method as described in claim 1, wherein said photocurrent is monitored by voltage recording means in circuit with said constant-current source, and the anodization of said metal layer is ceased when said voltage recording means ceases to fluctuate due to the periodic illumination of said device.

3. In a method as described in claim 1, wherein said metal layer comprises aluminum and forms a Schollky-barrier with said N-type semiconductor body.

4. In a method as described in claim 1, wherein said metal layer comprises an oxidizable metal from the group consisting of barium, bismuth, calcium, cadmium, cobalt, chromium, copper, iron, hafnium, molybdenum, nickel, lead, tin, tantalum, vanadium, tungsten, zinc, and zirconium.

5. In a method as described in claim 1, the step of illuminating said device periodically with light comprises directing a beam of light onto said metal layer and interrupting said beam periodically, the frequency of interruption being about 20 cycles per second, or slower.

6. A method of detecting the completion of plasma anodization of a metal layer on a semiconductor body of a semiconductor device, comprising the steps of:

disposing said device in an oxygen plasma, providing a constant current from a constant-current source through said semiconductor device and said plasma in a conventional direction from said semiconductor body to said metal layer, illuminating said device periodically with light to cause a photocurrent to flow through said device when said metal layer approaches complete anodization and to cause the voltage across said constant-current source to fluctuate, monitoring the voltage across said constant-current source, and terminating said anodization when said voltage ceases to fluctuate.

7. A method of detecting the completion of plasma anodization of a metal layer on a semiconductor body of a semiconductor device as described in claim 6, wherein the step of illuminating said device periodically with light comprises directing a beam of light onto said metal layer and interrupting said beam periodically at a frequency within the range of about 20 cycles per second, to about 10 cycles per hour.

8. A method of detecting the completion of plasma anodization of a metal layer on a semiconductor body of a semiconductor device, as described in claim 6, wherein the step of monitoring said voltage across said constant-current source comprises producing a graph of said voltage versus time, and interrupting said constant current and said plasma when the voltage ceases to fluctuate.

9. A method of detecting the completion of plasma anodization of a meal layer on a semiconductor body of a semiconductor device as defined in claim 6, wherein said metal layer comprises aluminum.

10. A method of detecting the completion of plasma anodization of a metal layer on a semiconductor body of a semiconductor device as defined in claim 6, wherein said metal layer comprises an oxidized metal from the group consisting of barium, bismuth, calcium, cadmium, cobalt, chromium, iron, copper, hafnium, molybdenum, nickel, lead, tin, tantalum, vanadium, tungsten, zinc, and zirconium.

* * * * *